United States Patent Office 3,702,818
Patented Nov. 14, 1972

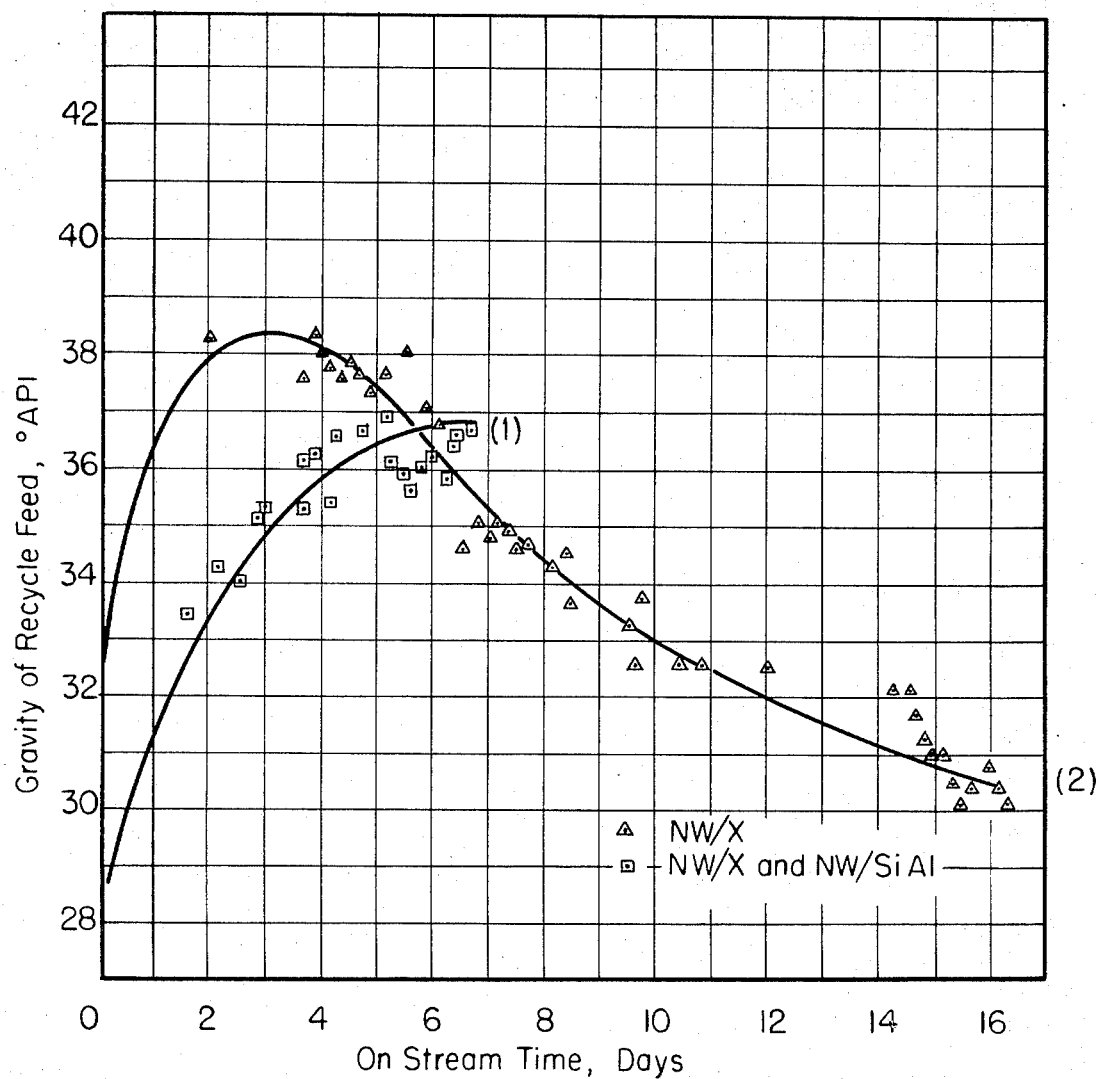

3,702,818
HYDROCRACKING PROCESS WITH ZEOLITE
AND AMORPHOUS BASE CATALYSTS
Carl W. Streed, Haddonfield, and Tsoung-Yuan Yan,
Gloucester, N.J., assignors to Mobil Oil Corporation
Continuation of application Ser. No. 587,113, Oct. 17,
1966. This application May 23, 1968, Ser. No. 732,496
Int. Cl. C10g 23/00, 13/10
U.S. Cl. 208—89
14 Claims

ABSTRACT OF THE DISCLOSURE

This invention relates to a process for hydrocracking heavy petroleum feeds to produce fuels. Said heavy feed is first partially hydrofined and then hydrocracked over a crystalline aluminosilicate. The effluent of the hydrocracking step is separated into gases, gasoline, and higher boiling material and the higher boiling material is hydrocracked over an amorphous base hydrocracking catalyst and the effluent also separate into various product fractions.

Figure 1:
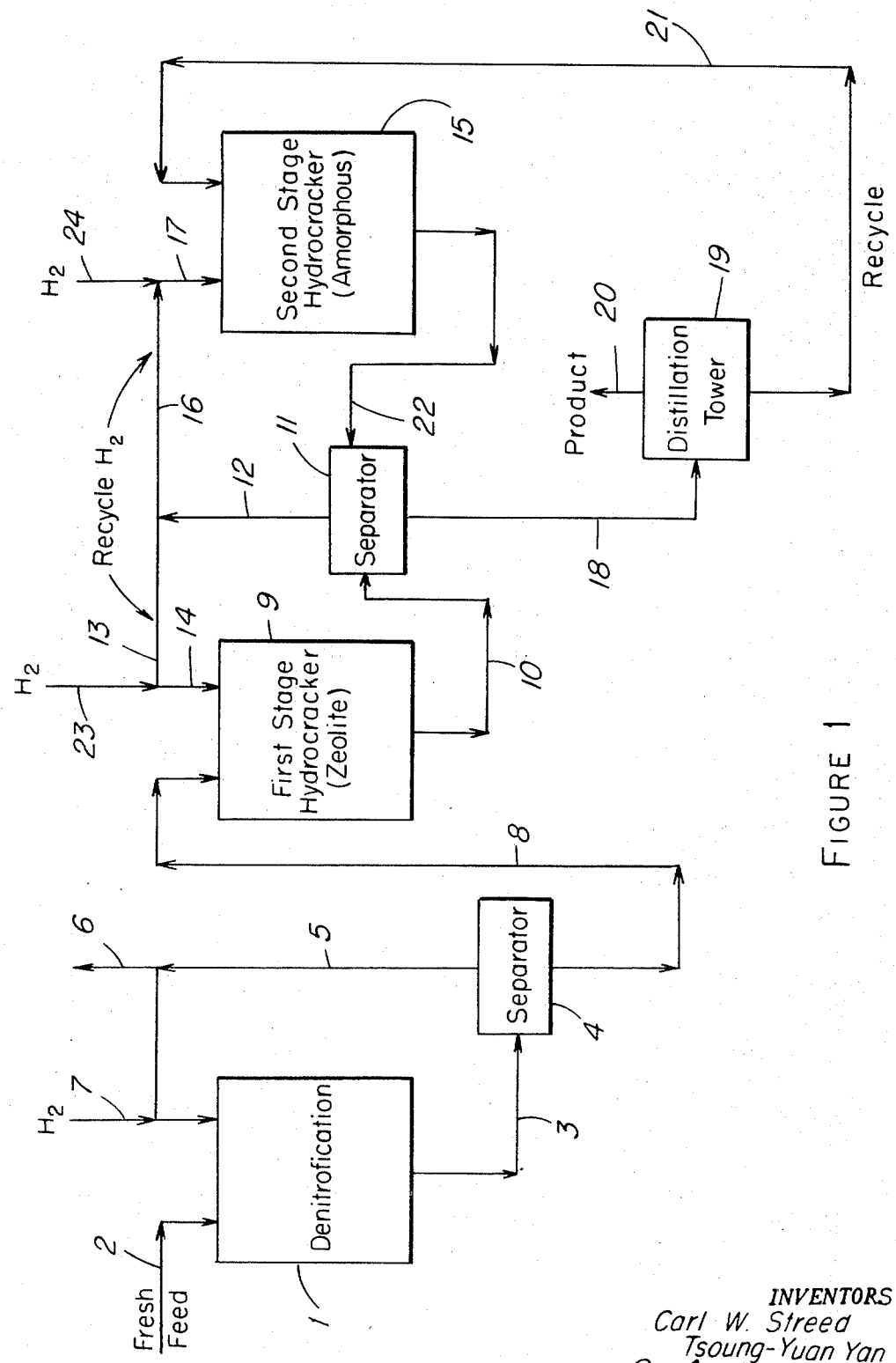

This is a continuation of application Ser. No. 587,113, now abandoned.

This invention relates to a process for catalytically hydrocracking petroleum hydrocarbons to produce fuels. More specifically, this invention relates to a process for hydrocracking wherein hydrocarbons can be hydrocracked to extinction in the absence of excessive gas formation.

Recently, there has been an increased incentive toward the use of hydrocracking processes to produce fuels, especially gasoline. Hydrocracking has found special use in converting relatively refractory feeds containing heavy aromatic hydrocarbons or other polycyclic hydrocarbons to lower boiling products such as gasoline without excessive gas and coke formation. It has been proposed to employ a catalyst comprising a hydrogenating component on a cracking base which can be either an amorphous base such as silica-alumina or a zeolite base. When an amorphous base catalyst is employed, it is necessary to pretreat the hydrocarbon feed to remove practically all of the organic nitrogen compounds therefrom. Unless the pretreatment step is employed, the organic nitrogen compounds effect serious degradation of the amorphous base catalyst under hydrocracking conditions and results in a rapid catalyst deactivation. When this occurs, either or both frequent regenerations and/or the use of undesirable conditions which adversely affect catalyst selectivity becomes necessary to maintain desired hydrocracking conversions. In addition, the amorphous base catalysts generally exhibit less activity as compared to the zeolite catalysts and have higher aging rates (less stability) than the zeolite catalysts.

Zeolite base catalysts on the other hand, exhibit increased cracking activity for the relatively nonrefractory portions of the feed and decreased degradation due to the effects of organic nitrogen compounds as compared to the amorphous base catalysts. In addition, zeolite base catalysts exhibit an improved selectivity as compared to the amorphous base catalyst in that less light hydrocarbon materials such as butane are produced. It is these characteristics of the zeolite base catalysts which have promoted their increased use in hydrocracking processes. However, the zeolite base catalysts suffer the disadvantage of exhibiting a poor ability in cracking relatively high molecular weight polycyclic hydrocarbons as compared to the amorphous base catalysts. This is probably because of intraparticle diffusion limitation caused by the relatively small pore sizes of the zeolites. It is this disadvantage that restricts the use of a zeolite type catalyst when it is desired to practice extinction cracking. By extinction cracking is meant a process for the substantially complete conversion of fresh feed to obtain desirable product, in this case fuels such as gasoline, under favorable conditions of selectivity by recycling unconverted hydrocracking effluent until it is substantially totally converted. When zeolite catalysts are employed to hydrocrack feeds containing refractory hydrocarbons under normal hydrocracking conditions, the API gravity of the unconverted recycle effluent from the hydrocracking step steadily decreases during the time the hydrocracker is on stream due to increased concentrations therein of refractory polycyclic hydrocarbons. In many cases, the API gravity of the hydrocracked recycle effluent becomes even less than the API gravity of the incoming pretreated hydrocarbon feed. To hydrocrack the increasingly poor quality recycle effluents, it becomes necessary to employ increasingly severe conditions, as, for example, increased temperature. When relatively severe hydrocracking conditions are employed to effect cracking of the recycle effluent, a yield loss in fuel product generally occurs. This yield loss is caused by secondary cracking reactions of the lower boiling portions of the hydrocarbon feed to form excessive amounts of undesirable gaseous product. In addition, under increased severity conditions, the zeolite catalyst tends to become plugged with cokey material which results in a loss of catalyst activity. The alternative of preliminarily separating from the feed the major proportion of the refractory polycyclic hydrocarbons by, for example, fractionation, is particularly disadvantageous since this would result in either a corresponding yield loss or a corresponding increase of necessary feed material to obtain corresponding yields.

When an amorphous base catalyst is employed in hydrocracking, the hydrocarbon feed should contain less than about 100 p.p.m. organic nitrogen and preferably less than about 10 p.p.m. organic nitrogen. When a zeolite base catalyst is employed in hydrocracking, the hydrocarbon feed should contain less than about 500 p.p.m. organic nitrogen and preferably less than about 30 p.p.m. organic nitrogen depending on the charge stock. Organic nitrogen compounds can be removed from the hydrocracker feed by a number of methods, the preferred method being by hydrorefining to convert the nitrogen compounds to ammonia. When a zeolite catalyst is employed in the hydrocracking step, the converted ammonia either can be removed from the hydrocracker feed in which case relatively low catalyst aging rates are obtained or can be retained in the hydrocracker feed, in which case savings result from eliminating intermediate feed compressing and heating steps. The ammonia can be allowed to remain in the feed in limited amounts when zeolite catalysts are used since the zeolite catalyst still retains a substantial amount of its activity in the presence of ammonia. Amorphous base catalysts, on the other hand, do not retain their activity in the presence of ammonia and increasingly severe hydrocracking conditions are necessitated thereby. The use of increasingly severe hydrocracking conditions results in poor product selectivity.

The hydrorefining pretreatment is conducted by contacting the nitrogen containing hydrocarbon feed with hydrogen in the presence of a hydrogenating catalyst. The hydrorefining conditions are generally relatively mild and are maintained so as to effect denitrofication and desulfurization while minimizing hydrocracking reactions. Hydrocracking reactions are to be minimized during the hydrorefining step since the catalyst becomes seriously deactivated thereby and selectively of the catalyst is adversely affected. This necessitates either increased hydrorefining capacity or frequent regeneration of the hydrogenating catalyst. In an integrated hydrorefining-hydrocracking process where the hydrorefined liquid effluent is directed to the hydrocracking step, it is desirable to limit hydrorefining capacity to afford economic operation and to avoid frequent regeneration of the hydrogenating catalyst to minimize process down time. The hydrogenating catalyst usually employed comprises a hydrogenation component unsupported or supported on an absorbent base having little or no cracking activity. The hydrogenation component can be a Group VI–B metal or Group VIII metal of the Periodic Table, their oxides, their sulfides or mixtures thereof. Typical of such hydrogenation components are nickel oxide, cobalt oxide, cobalt sulfide-molybdenum sulfide, and nickel sulfide-tungsten sulfide and the like. Suitable carriers or absorbent supports include heat stable inorganic oxides such as alumina, clay such as bauxite, zirconia, titania and the like. The hydrogenation component is usually present on the support in amounts of from about 5 weight percent to about 40 weight percent based on the weight of the support.

It is an object of this invention to provide an improved hydrocracking process.

It is a further object of this invention to provide a hydrocracking process whereby a hydrocarbon feed is substantially converted to desired products in a selective manner.

It is a further object of this invention to provide a hydrocracking process whereby a hydrocarbon feed is substantially converted to desired products while maintaining low catalyst aging rates.

Accordingly, this invention relates to a catalytic hydrocracking process whereby a hydrocarbon feed is cracked to extinction to produce fuels, especially gasoline. A portion of the hydrocarbon feed is converted in the presence of a zeolite base hydrocracking catalyst while substantially the remainder of the hydrocarbon feed is converted in the presence of an amorphous base hydrocracking catalyst. Conditions of conversion are maintained so that the zeolite base catalyst preferentially hydrocracks those compounds of a molecular size sufficiently small which facilitate their entry and exit through the zeolite pores. The smaller molecular size compounds are predominantly found in the lower boiling portions of the hydrocarbon feed. In addition, conditions of conversion are maintained such that the amorphous base catalyst preferentially hydrocracks those compounds having a molecular size too large to facilitate entry thereof into the zeolite pores. The larger molecular size compounds are predominately found in the higher boiling portions of the hydrocarbon feed. Further, conditions of conversion are maintained such that catalyst selectivity for gasoline boiling range products for the present invention is greatly improved over the selectivity for gasoline boiling range products which can be obtained when using either amorphous base or zeolite base hydrocracking catalysts alone. Thus, by the process of this invention, the amorphous catalyst and zeolite catalyst are maintained in separate reactors or in the same reactor in separate beds. The incoming hydrocarbon feed having relatively low organic nitrogen concentration can contact either the amorphous base catalyst or the zeolite catalyst in the first hydrocracking zone. In any event, the fraction boiling above the desired products obtained from the final hydrocracking zone is recycled to contact the amorphous base catalyst.

In accordance with the present invention, a high boiling hydrocarbon feed is hydrorefined, if necessary, to reduce the organic nitrogen content thereof to less than about 500 p.p.m. when first contacting a zeolite base catalyst and less than about 100 p.p.m. when first contacting an amorphous base catalyst. The effluent from the hydrorefining step is directed to a separator to separate ammonia and hydrogen sulfide from the hydrocarbon feed which is to be hydrocracked. The feed to be hydrocracked which is obtained from the separator, is contacted with a zeolite base hydrocracking catalyst and an amorphous base hydrocracking catalyst each being in a separate zone. The hydrocracking conditions are maintained such that the zeolite base catalyst having a pore size of from about 6 to about 15 angstroms preferentially hydrocracks those compounds which can enter the pores of the zeolite relatively easily while the amorphous catalyst preferentially hydrocracks those compounds which cannot enter pores of the zeolite relatively easily. In the second hydrocracking zone, conversion of the gasoline boiling range products produced in the first hydrocracking zone is minimized. This is accomplished by the present invention either by separating the gasoline boiling range products boiling below about 400° F. from the first hydrocracking zone effluent and directing the effluent fraction boiling above about 400° F. to the second hydrocracking zone, or by not separating the first hydrocracking zone effluent and maintaining the conversion and temperature in the second hydrocracking zone within specified limits. However, in either case, the effluent from the second hydrocracking zone is separated to recover gasoline boiling range products boiling below about 400° F. and a fraction boiling above about 400° F. The fraction boiling above about 400° F., or a portion thereof recovered from the second hydrocracking zone is cracked to extinction by recycling it to the zone containing the amorphous base catalyst. When the gasoline boiling range products are not separated from the first hydrocracking zone effluent, the first hydrocracking zone effluent can be cooled prior to its introduction into the second hydrocracking zone to maintain conversion and temperature control therein. When the hydrocracked effluent from both hydrocracking zones are separated to recover gasoline boiling range products therefrom, the fraction boiling above the gasoline boiling range is directed to the second hydrocracking zone. The effluent fraction boiling above the gasoline boiling range from the second hydrocracking zone is recycled to the hydrocracking zone containing the amorphous base catalyst. The amount of gasoline produced is maximized by recycling all of the effluent boiling above the gasoline boiling range to contact the amorphous base catalyst.

It has been found that by employing both a zeolite base hydrocracking catalyst and an amorphous base hydrocracking catalyst in combination, substantial process improvements are obtained over a process using either zeolite base hydrocracking catalyst or amorphous base hydrocracking catalyst alone. It unexpectedly has been found that when both types of hydrocracking catalysts are employed in a hydrocracking process, gasoline boiling range products are produced in high yields with an improved selectivity toward gasoline products while maintaining low catalyst aging rates. Substantially the total amount of hydrocarbon feed is converted, including the refractory portions thereof, i.e., polycyclic compounds with an accompanying lower production of gas boiling at about $C_4$ and below than is produced by a process which uses either catalyst alone. Thus the process of this invention affords a means for the practical application of a hydrocracking process for reasons including the fact that less hydrocarbon feed is required to produce target amounts of gasoline boiling range products as compared to a process using either type of catalyst alone. In addition, by this process the desired amount of conversion of hydrocarbon feed is obtained while at the same time producing less gas product as compared with a process which employs either type catalyst alone. Further by this process, the desired amount of conversion is obtained while at the same time having lower catalyst aging rates as compared with a process which employs either type catalyst alone. It is these three factors in combination, namely high yields, good selectivity and low catalyst aging rate toward which practical applications of a hydrocracking process are directed. The process of the present invention is characterized by these advantages even when employing relatively poor hydrocarbon feeds containing hydrogen deficient refractory hydrocarbon compounds.

Throughout the specification and claims, the term "conversion" is intended to describe the amount of feed in terms of volume percent of the initial charge converted to products boiling below about 400° F. on a single pass basis.

The amorphous base hydrocracking catalyst referred to herein comprises one or more hydrogenation components in combination with an amorphous base cracking component and have pores of a size above about 20 angstroms, preferably between about 30 and about 200 angstroms, and more preferably between about 40 and about 100 angstroms. The hydrogenation components which can be employed herein includes the Group VI-B and Group VIII metals of the Periodic Table as well as their oxides, or their sulfides or mixtures thereof. The Group VI-B metals which can be employed include chromium, molybdenum and tungsten while the Group VIII metals which can be employed include iron, nickel, cobalt, the platinum group metals and the palladium group metals. The preferred hydrogenation components are nickel-tungsten sulfide, nickel sulfide, cobalt-molybdenum sulfide, platinum and palladium. The amorphous cracking components which can be used herein includes the oxides of metals of Groups II-A, III-A, and IV-B of the Periodic Table as well as silica or mixtures therof. Examples of amorphous cracking bases which can be employed herein include silica-alumina, silica-zirconia, silica-magnesia, silica, alumina and the like. The amorphous base cracking components employed herein are those having an activity index above about 20 and preferably above about 35 as measured by the "Cat A" test described by Alexander and Shimp in National Petroleum News, 36 page R–537 (Aug. 2, 1944).

The hydrogenation metal component of the amorphous catalyst comprises from about 0.1 to about 25 weight percent based upon the weight of the amorphous cracking base. When noble metals such as platinum or palladium are employed preferably from about 0.1 to about 6 weight percent and more preferably from about 0.2 to about 2 weight percent are employed based upon the weight of amorphous cracking base. When the hydrogenation metal component is other than a noble metal, it is preferred to employ from about 6 to about 18 weight percent thereof based upon the weight of the amorphous cracking base. The hydrogenation component can be introduced into the amorphous base by impregnation, coprecipitation on the base surface, by admixture or by other methods well known in the art. A preferred amorphous base hydrocracking catalyst comprises nickel sulfide and tungsten sulfide in amounts of from 6 to 18 weight percent of the nickel and tungsten metals on an amorphous silica-alumina base containing from 60 to 90 weight percent silica and having an activity index above about 40.

The zeolite hydrocracking catalysts employed herein comprises one or more hydrogenation components, in combination with a crystalline aluminosilicate zeolite base material having cracking activity. The hydrogenation components which can be employed with the zeolite base include the Group VI-B and Group VIII metals of the Periodic Table as well as their oxides or their sulfides or mixtures thereof. The Group VI-B metals which can be employed include chromium, molybdenum and tungsten while the Group VIII metals which can be employed include iron, nickel, cobalt, the platinum group metals and the palladium group metals. The preferred hydrogenation components are nickel-tungsten, cobalt-molybdenum, platinum and palladium. The zeolite cracking component is a crystalline aluminosilicate structure having uniformly dimensioned pores formed by alumina and silica tetrahedra. There are available at the present time a number of crystalline aluminosilicates, each of which have their own characteristic pore size openings. For purposes of the present invention, it is desirable to employ a crystalline alumino-silicate having pore size openings between about 6 angstroms and about 15 angstroms. The crystalline aluminosilicates employed herein are characterized by a low sodium or alkali metal content of below about 5 weight percent, and preferably below about 2 weight percent, calculated as alkali metal oxide, based upon the weight of the crystalline aluminosilicate.

The zeolites employed herein can be derived from naturally occurring zeolites or synthetic zeolites by employing known base-exchanging techniques. Among the zeolites which can be base-exchanged for use in the present invention are the naturally occurring zeolites such as faujasite, mordenite, chabazite, stilbite, ferrionite, heulandite, dachiaridite, and erionite and the synthetic zeolites such as zeolites X, Y, B, L. and T. These synthetic zeolites are described in U.S. Pat. 3,140,252, issued July 6, 1964. The above zeolites are base-exchanged with a fluid containing metal ions which are exchangeable with sodium or alkali metal ion in a manner such as described in U.S. Pats. 3,140,249 and 3,140,253 to Plank et al. issued July 7, 1964 to obtain a selective high activity cracking catalyst.

Metallic cations which can be exchanged with the alkali metal ions in the zeolite to improve the cracking activity thereof are those in the Groups I-B through VIII of the Periodic Table as well as the rare earths. In addition, the alkali metal can be removed from the zeolite by base-exchanging with a hydrogen containing cation such as the ammonium ion to obtain the zeolite in hydrogen form. Further, the zeolite can be base-exchanged in a manner to replace the alkali metal cation with a mixture of the above metal cations or a mixture of the above metal cations with a hydrogen containing ion. The preferred forms of the zeolite are those containing rare earth metal cations, rare earth metal cations and hydrogen ions or nickel cations since these forms of the zeolite exhibit high cracking activity and good selectivity. In any event, the alkali metal content of the zeolite calculated as alkali metal oxide should be below about 5 weight percent and preferably below about 2 weight percent based upon the weight of zeolite to obtain the desired cracking activity and selectivity.

The hydrogenation metal component of the zeolite catalyst is present in amounts of from about 0.1 to about 25 weight percent based upon the weight of zeolite cracking base depending upon the hydrogenation metal employed.

Noble metals such as platinum or palladium are employed in amounts preferably from about 0.1 to about 6 weight percent and more preferably from about 0.2 to about 2 weight percent based upon the weight of the zeolite base catalyst. When the hydrogenation metal component is other than a noble metal, it is preferred to employ from about 6 to about 18 weight percent thereof based upon the weight of the zeolite base catalyst. The hydrogenation component can be introduced into the zeolite base catalyst by ion exchange, impregnation or as a physical mixture or by other methods well known in the art. Preferred zeolite catalysts include hydrogenation components such as nickel sulfide and tungsten sulfide mixtures in amounts of between about 5 and about 15 weight percent of the nickel and tungsten metals, platinum in amounts of from about 0.1 and about 5 weight percent with rare earth containing or hydrogen containing zeolite Y or zeolite X.

The hydrocarbon feeds which can be employed in the process of this invention are those distillates boiling in the range of between about 400° F. and about 1100° F. or residual fractions which are essentially free of ash and asphalt constituents. Hydrocarbon feeds which can be employed include virgin heavy vacuum gas oil, coker gas oil from catalytic cracking processes, the heavy aromatic extracts obtained by furfural extracting high boiling hydrocarbons such as propane deasphalting raffinate, light, medium and heavy gas oils or mixtures thereof.

Accordingly, in one embodiment of the present invention, a hydrocarbon feed which has been previously treated to have low organic nitrogen concentration is catalytically hydrocracked in a first hydrocracking stage with a zeolite base catalyst and in a second hydrocracking stage with an amorphous base catalyst. The hydrocarbon carbon feed to the first hydrocracking stage should contain less than about 500 p.p.m. or organic nitrogen therein, and preferably less than about 30 p.p.m. of organic nitrogen. When employing the zeolite base catalyst in the first hydrocracking stage, several processing advantages are obtained. Zeolite base catalysts are not as seriously degraded by organic nitrogen compounds as are amorphous base catalysts. Thus, the conditions under which the feed is pretreated, preferably by hydrorefining to convert organic nitrogen compounds to ammonia are relatively mild. This in turn reduces the needed operating severity of the hydrorefining step since the last traces of these nitrogen compounds are very difficult to remove. The reduced needed operating incoming feed must contain much lower concentrations of organic nitrogen, as compared to zeolite catalysts to retain satisfactory catalyst aging rates severity for the hydrorefining step reduces catalyst aging rates therein and results in a substantial advantage. Further, when contacting the hydrocarbon feed in the first hydrocracking stage with the zeolite catalyst, the polycyclic aromatic compounds become more saturated therein. When these polycyclic compounds are hydrocracked in the second hydrocracking stage with the amorphous base catalyst, the tendency toward coke formation therein is reduced because of their increased hydrogen content.

In the hydrorefining step, which precedes the first hydrocracking stage, the incoming hydrocarbon feed is contacted with a hydrogenating catalyst under relatively mild conditions in the presence of hydrogen to convert organic nitrogen compounds to ammonia and organic sulfur compounds to hydrogen sulfide. In the hydrorefining step, it is desirable to convert the nitrogen compounds while minimizing undesired hydrocracking reactions to provide a feed of reduced nitrogen content as discussed herein.

The degree of conversion maintained in each hydrocracking zone is dependent in part upon whether the gasoline boiling range products boiling below about 400° F. are separated from the first hydrocracker effluent prior to the introduction thereof into the second hydrocracking zone. Thus, when a separation of the first hydrocracker effluent is effected, the conversion in each hydrocracking zone is maintained between about 40 and about 80 percent, preferably between about 50 and about 70 percent on a single pass basis based upon the respective feeds to each hydrocracking zone. The embodiment wherein no separation of lower boiling range hydrocarbons is effected between hydrocracking zones is discussed below.

Conversion of incoming feed to products boiling below 400° F. of below about 40% results in loss of product yield rates due to excessive amounts of recycle while conversions above about 80% result in excessive overcracking of feed to coke and gaseous products. The conditions in the first hydrocracking stage are maintained at a temperature in the range of between about 450° F. and about 900° F., preferably between about 550° F. and about 750° F.; a total pressure in the range of between about 500 p.s.i.g. and about 5000 p.s.i.g., preferably between about 1000 p.s.i.g., and about 3000 p.s.i.g.; a liquid hourly space velocity of between about 0.1 v./hr./v. and about 10 v./hr./v., preferably between about 1 v./hr./v. and about 5 v./hr./v. and a hydrogen circulation rate of between about 1000 s.c.f./b. and about 20,000 s.c.f./b., preferably between about 3000 s.c.f./b. and about 8000 s.c.f./b. The effluent from the first hydrocracking stage is directed to a separator wherein normally liquid effluent is separated from normally gaseous effluent containing hydrogen, hydrogen sulfide and normally gaseous hydrocarbons. A hydrogen rich gas is recovered from the gaseous effluent and recycled to the first hydrocracking zone. The liquid from the separation step is further separated into gasoline boiling range products boiling below about 400° F. and liquid boiling above the desired gasoline boiling range. The liquid boiling above the desired gasoline range is then directed to a second hydrocracking stage.

In the second stage hydrocracking reactor, an amorphous base catalyst such as described above is employed. In the second hydrocracking stage, the conditions are maintained at a temperature of between about 500° F. and 850° F., and preferably between about 550° F. and 750° F., a total pressure of between about 500 p.s.i.g. and about 3000 p.s.i.g., preferably between about 1000 p.s.i.g. and about 2000 p.s.i.g., a liquid hourly space velocity of between about 0.1 and about 10 v./hr./v., and preferably between about 0.5 and about 2 v./hr./v., and a hydrogen circulation rate of between about 500 and about 20,000 s.c.f./b. and preferably between about 3000 and about 8000 s.c.f./b. The effluent from the second hydrocracking stage is directed to a separation step to recover the desired gasoline boiling range products. The effluent from the second hydrocracking stage which boils above the gasoline boiling range product is separated and recycled back to the inlet portion of the second hydrocracking stage. The recycle stream is mixed with the incoming pretreated feed to the second hydrocracking stage, and is cracked to extinction therein. In addition, a hydrogen rich gas is recovered from the separation step and recycled to the second hydrocracking zone. In the process of this invention it is preferred to employ a common separation step for both the first hydrocracking stage effluent and the second hydrocracking stage effluent since substantial economic advantages are obtained thereby. When the common separation step is employed, a portion of the hydrogen rich gas recovered therefrom is recycled to the first hydrocracking stage and the remainder is recycled to the second hydrocracking stage.

As discussed above, in one embodiment, it is within the scope of this invention to employ an amorphous base hydrocracking catalyst in the first hydrocracking stage and a zeolite base hydrocracking catalyst in the second hydrocracking stage. This embodiment is useful when processing heavy hydrocarbon feeds having an initial boiling point above about 800° F. The effluent or the portion thereof boiling above about 400° F. from the first hydrocracking stage containing the amorphous catalyst is directed to the second hydrocracking stage containing the zeolite catalyst. The portion of the effluent boiling above about 400° F. from the second hydrocracking stage is recycled to the first hydrocracking stage. Advantages are obtained in this embodiment over using either hydrocracking catalyst alone in that the feed can be cracked to extinction to produce gasoline boiling range products under conditions of improved selectivity and relatively low catalyst aging rates. However, when employing amorphous catalyst in the first hydrocracking stage, certain disadvantages result when compared to the process embodiments described above wherein zeolite catalyst is employed in the first hydrocracking stage. These disadvantages result from the need to control process variables within more limited ranges in order to obtain the desired yields, catalyst selectivity and catalyst aging rates. Thus, when an amorphous base catalyst is employed in the first hydrocracking stage, the incoming feed must contain much lower concentrations of organic nitrogen, as compared to zeolite catalysts to retain satisfactory catalyst aging rates therein. This in turn requires that the preliminary hydrorefining step be operated at increased severity to convert these organic compounds to ammonia and increases the probability of quickly degrading the hydrogenating catalyst.

In addition, when employing the amorphous base catalyst in the first hydrocracking stage rather than the second hydrocracking stage, the tendency for coking thereon is increased. This is because the polycyclic portions of the feed are hydrogen deficient and are therefore good coke precursors. Thus an increased amount of hydrogen in this step is required to reduce coking. On the other hand, when the pretreated feed is hydrocracked first with the zeolite, the polycyclics generally are not cracked therein but become more saturated. These relatively saturated polycyclics, when contacted with the amorphous catalyst in the second hydrocracking stage, have a reduced tendency toward coking. This results in a less amount of hydrogen being necessary to control catalyst coking.

Further, when the amorphous base catalyst is used in the first hydrocracking stage, it is not commercially feasible to employ a common separation step for both hydrocracking stages. This is because it becomes difficult to separate the portion of the first hydrocracking stage effluent boiling above the desired gasoline boiling range from the second hydrocracking stage effluent boiling above the desired gasoline boiling range in a common separation step and would require special expensive apparatus. As discussed above the separation would be necessary since the higher boiling effluent from the hydrocracking step containing the amorphous catalyst is directed to contact the zeolite catalyst while the higher boiling effluent from the hydrocracking step containing the zeolite catalyst is recycled to contact the amorphous base catalyst.

Even when it is desired to employ a process wherein the first hydrocracking stage effluent is not separated to recover gasoline boiling range products, use of the amorphous catalyst rather than zeolite catalyst in the first hydrocracking stage is less desirable. This is because zeolite catalysts have a higher activity for cracking the lower boiling hydrocarbons than do the amorphous base catalysts. Thus when employing the zeolite in the second stage without removing the gasoline boiling range products from the first stage effluent, the tendency for overcracking the gasoline boiling range products produced with the amorphous catalyst becomes increased due to the increased amounts of these products in the feed to the zeolite catalyst. This increased concentration of desired product in the feed to the second stage containing the zeolite catalyst requires that the reaction conditions be controlled within strict limits to minimize overcracking thereof.

However, even though in a process wherein the amorphous catalyst is used in the first hydrocracking stage and a zeolite catalyst is used the second hydrocracking stage is less desirable than the preferred embodiment discussed above, this process does offer advantages over a process which employs either catalyst alone. This process permits extinction hydrocracking of a feed to gasoline boiling range products with improved selectivity toward gasoline and relatively low catalyst aging rates as compared to a process which employs either catalyst alone.

When employing the amorphous catalyst in the first hydrocracking stage, the feed contains below about 100 p.p.m. of organic nitrogen and preferably below 10 p.p.m. of organic nitrogen. The effluent from a hydrorefining step is preferably directed to a separator wherein a normally gaseous component containing ammonia and hydrogen sulfide is separated from the normally liquid component. The liquid component from the separator is directed to the first stage hydrocracking stage containing the amorphous base catalyst. The conversion in each hydrocracking zone is maintained between about 40 and about 80 percent, preferably between about 50 and about 70 percent on a single pass basis based upon the respective feeds to each hydrocracking zone. Conditions in the first hydrocracking stage containing the amorphous catalyst are maintained at a temperature of between about 500° F. and about 850° F. and preferably between about 550° F. and about 750° F., at a total pressure of between about 500 p.s.i.g. and about 3000 p.s.i.g., and preferably between about 1000 p.s.i.g. and 2000 p.s.i.g., at a space velocity of between about 0.1 and about 10 v./hr./v., preferably between about 0.5 and about 2 v./hr./v., and a hydrogen circulation rate of between about 500 and about 20,000 s.c.f./b. and preferably between about 3000 and about 8000 s.c.f./b. The effluent from the first hydrocracking stage is preferably directed to a separator wherein the normally gaseous portion of the effluent is separated from the normally liquid portion of the effluent. The normally gaseous portion of the effluent contains a major proportion of hydrogen and contains low boiling gaseous hydrocarbons. A hydrogen rich gas is obtained from the gaseous portion of the effluent and is recycled for use in the hydrocracking reactions.

The liquid effluent from the separator is directed to a second hydrocracking stage which contains a zeolite base hydrocracking catalyst. Conditions are maintained at a temperature of between about 450° F. and about 900° F., preferably between about 550° F. and about 750° F.; a total pressure of between about 500 p.s.i.g. and about 5000 p.s.i.g., preferably between about 1000 p.s.i.g. and about 3000 p.s.i.g., at a space velocity between about 0.1 and about 10 v./hr./v. and preferably between about 1 and about 5 v./hr./v., and at a hydrogen circulation rate of between about 1000 and about 20,000 s.c.f./b. and preferably between about 3,000 and about 8,000 s.c.f./b. The effluent from the second hydrocracking stage is then directed to a separation step wherein desired gasoline products are separated from gaseous products and a heavy liquid effluent. The heavy liquid effluent from the separation step is then recycled back to the first hydrocracking stage in order to substantially totally convert the recycle to desired gasoline products. In this manner, the incoming feed is substantially totally converted to produce predominately gasoline without producing an excessive amount of gaseous hydrocarbons.

As discussed above, in one embodiment of the present invention, the effluent from the first hydrocracking zone is not separated to remove lower boiling hydrocarbons prior to being directed to the second hydrocracking zone. When no separation is effected between zones, the conversion to products boiling below 400° F. in each zone is maintained below about 40 percent with the overall conversion for both zones being between about 40 and about 80 percent, preferably between about 50 and about 70 percent on a single pass basis based upon the feed to the first hydrocracking zone. Hydrocracking of the lower boiling range hydrocarbons such as gasoline produced in the first hydrocracking stage is minimized in the second hydrocracking stage by controlling temperature conditions therein. This embodiment has the advantage of eliminating a product separation step or reducing the capacity of a product separator between hydrocracking stages. However, the conditions of temperature in the second hydrocracking zone must be more strictly regulated as compared to a process which separates the gasoline boiling range products from the first hydrocracking stage effluent. Since hydrocracking is an exothermic reaction, the effluent obtained from the first hydrocracking stage can be cooled prior to its introduction into the second hydrocracking stage. The process of this invention in this embodiment can be carried out either in a common reactor having separate hydrocracking beds through which the hydrocarbon feed to be cracked is passed serially or in separate reactors. When employing separate catalyst beds in a single reactor, temperature control becomes increasingly important since it is very difficult to vary pressure and space velocity between beds to control conversion therein. Usually from three to five separate beds are employed in the embodiment wherein a single reactor is employed. In this embodiment, the feed is pretreated, preferably by hydrorefining to convert organic nitrogen and organic sulfur compounds in a manner described above and to reduce the organic nitrogen content to less than about 200 p.p.m.

The effluent from the final hydrocracking stage is fractionated to recover fractions including a gasoline boiling range fraction and a higher boiling fraction boiling above about 400° F. The higher boiling fraction from the separator is then recycled to the hydrocracking stage containing the amorphous catalyst.

When the gasoline boiling range products are not separated from the first hydrocracking stage effluent conditions in the hydrocracking stage containing amorphous base catalyst are maintained at a temperature between about 500° F. and about 850° F., preferably between about 550° F. and about 750° F., a total pressure between about 500 p.s.i.g. and about 3000 p.s.i.g., preferably between about 1000 p.s.i.g. and about 2000 p.s.i.g., a liquid hourly space velocity between about 0.1 v./hr./v. and about 10 v./hr./v., preferably between about 0.5 and about 2 v./hr./v.; and a hydrogen circulation rate between about 500 s.c.f./b. and about 20,000 s.c.f./b., preferably between about 3000 s.c.f./b. and about 8000 s.c.f./b.

Conditions in the hydrocracking stage containing the zeolite catalyst are maintained at a temperature between about 450° F. and about 900° F., preferably between about 550° F. and about 750° F.; a total pressure between about 500 p.s.i.g. and about 5000 p.s.i.g. and preferably from about 1000 p.s.i.g. to about 3000 p.s.i.g.; a liquid hourly space velocity between about 0.1 v./hr./v. and about 10 v./hr./v., preferably between about 1 v./hr./v. and about 5 v./hr./v.; and a hydrogen circulation rate of between about 1000 s.c.f./b. and about 20,000 s.c.f./b., preferably between about 3,000 s.c.f./b. and about 8000 s.c.f./b.

As discussed above, it is intended to produce gasoline products boiling in the range of between about $C_5$ and about 400° F. by the process of this invention. The desired end point of a gasoline product can vary depending upon the conditions in the reforming step to which the gasoline boiling range products of this invention may be directed. Thus, in the process of this invention, the desired end point can be between about 300° F. and about 400° F. and is usually between about 360° F. and about 390° F. The effluent fraction from the final hydrocracking stage having above the desired gasoline product end point can be recycled for further hydrocracking. It is within the scope of the present invention to separate and recover hydrocarbon fractions boiling above the gasoline range from the final hydrocracking stage. Thus, a jet fuel fraction boiling from about 400° F. to about 550° F. can be recovered for further processing or a fuel oil can be recovered. More usually, the recycle fraction in the process of this invention boils above about 400° F. to maximize production of gasoline boiling range products.

FIG. 1 represents, in simplified form, the process flow to be employed when the zeolite catalyst is employed in the first hydrocracking stage and the amorphous catalyst is employed in the second hydrocracking stage with an intermediate separation step.

Referring now to FIG. 1, fresh feed is directed to hydrorefiner 1 through conduit 2 wherein it is contacted with a hydrogenation-dehydrogenation catalyst and hydrogen gas. The feed is subjected to mild hydrofining conditions in hydrorefiner 1 to minimize cracking reactions while converting nitrogen compounds to ammonia and sulfur compounds to hydrogen sulfide. The hydrorefined effluent is removed from hydrorefiner 1 through conduit 3 and directed to separator 4. In separator 4, the normally gaseous components are separated from the normally liquid components of the hydrofined effluent. The separated gaseous components are removed from separator 4 through conduit 5. A portion of the separated gas is removed from the system through conduit 6 while fresh hydrogen is introduced to the hydrorefiner 1 through conduit 7 to maintain desired hydrogen concentrations and to prevent a buildup of hydrogen sulfide and ammonia. The liquid portion of the hydrofined effluent is removed from separator 4 through conduit 8 and directed to a first hydrocracking stage 9 as a feed thereto.

The first hydrocracking stage 9 contains the zeolite base catalyst described above. The first hydrocracking stage feed is contacted with the zeolite catalyst and hydrogen under conditions to effect conversion thereof to obtain gasoline boiling range products. The effluent from the first hydrocracking stage is removed therefrom through conduit 10 and directed to separator 11. In separator 11 the first hydrocracking stage effluent is mixed with the effluent from the second hydrocracking stage effluent obtained in a manner described below. In separator 11, the effluent mixture is separated into a normally gaseous component and a normally liquid component. The gaseous component is removed from separator 11 through conduit 12 and is split with one portion being recycled to the first hydrocracking stage 9 through conduits 13 and 14 and to the second hydrocracking stage 25 through conduits 16 and 17. The gaseous component from separator 11 consists mainly of gaseous hydrocarbons boiling at $C_4$ and below and hydrogen and may contain small amounts of ammonia and hydrogen sulfide. The liquid portion of the hydrocracker effluents is removed from separator 11 through conduit 18 and directed to distillation tower 19. The liquid portion of the hydrocracked effluent consists mainly of hydrocarbons boiling at $C_5$ and above. In distillation tower 19, the gasoline products boiling below about 390° F. are separated from the hydrocracked effluent and removed from distillation tower 19 through conduit 20. The portion of the hydrocracked effluent boiling above about 390° F. is removed from distillation tower 19 through conduit 21 and directed to the second hydrocracking stage 15.

In the second hydrocracking stage 15, the liquid portion of the hydrocracked effluent, which contains unconverted feed from the first hydrocracking stage 9 and unconverted recycle feed which has been previously unconverted in both the first and second stage hydrocrackers 9 and 15, is contacted with an amorphous base hydrocracking catalyst and hydrogen to obtain gasoline boiling range products. The hydrocracked effluent from the second hydrocracking stage 15 is removed therefrom and directed to separator 11 through conduit 22. In separator 11, the second hydrocracking stage effluent is separated into a gaseous component and a liquid component in a manner described above. Fresh hydrogen is supplied to the first stage hydrocracker 9 and the second stage hydrocracker 15 through conduits 23 and 24 respectively.

The following examples are intended to assist in a fuller understanding of the present invention and are not intended to limit the same.

EXAMPLE 1

This example shows that when employing a zeolite cracking catalyst having a hydrogenation component alone to hydrocrack a relatively high boiling feed, poor product distribution is obtained at high conversions and recycle stream quality steadily deteriorates with time.

A nickel-tungsten impregnated rare earth zeolite X hydrocracking catalyst was prepared as follows:

18.9 pounds of partially rare earth exchanged zeolite X was mixed with a solution of 140 g. mixed rare earth chlorides $6H_2O$ in 2640 ml. water and heated to 180° F. for 1 hour. The resultant mixture was filtered with the liquid portion being discarded and the solids being retained. The above treatment was repeated with the solids recovered from the filtering step. The resultant solids were then washed with water until chloride free. The chloride free solids contained 0.6 weight percent sodium. The solids were then dried for 16 hours at 250° F. and then calcined for 1 hour at 1400° F. to obtain rare earth exchanged zeolite X as a powder. The rare earth X powder was mixed with an aqueous solution of ammonium hydroxide and tungstic acid containing 17.5 weight percent tungsten to effect an impregnation of tungsten in the powder of 10 weight percent based upon the weight of the resultant powder. The resultant mixture was dried at 250° F. for 16 hours to obtain the tungsten impregnated rare earth X powder. The tungsten impregnated powder was then mixed with an aqueous solution of nickel nitrate containing 14.5 weight percent nickel to effect an impregnation on the powder of 4 weight percent nickel based upon the weight of the resultant powder. The resultant mixture was then dried at 250° F. for 16 hours to obtain the nickel-tungsten impregnated rare earth X powder. The resultant powder was mixed with 2 weight percent stearic acid and pressed to obtain ⅛ inch by ⅛ inch pellets. The pellets were calcined by first slowly heating in an atmosphere comprising 98 volume percent nitrogen gas and 2 volume percent air to 850° F. and then in 100% air at 1000° F. for a total time of 3 hours.

The above catalyst was used to hydrocrack a pretreated hydrocarbon feed obtained by blending 20.4 volume percent light coker gas oil, 12.4 volume percent heavy coke gas oil, 19.3 volume percent light gas oil obtained from a TCC cracking process and 47.9 volume percent of a mixture of heavy gas oil obtained from a TCC cracking process and secondary extract obtained from furfural extraction of heavy TCC cycle stock. The hydrocracker feed was obtained by hydrorefining the above feed over a pretreating catalyst in the presence of hydrogen under the mild conditions of temperature 730° F., a total pressure of about 2000 p.s.i.g., a liquid hourly space velocity of 1 v./hr./v. and hydrogen circulation rate of about 7500 s.c.f./b. The raw and hydrorefined feeds had the following properties:

TABLE 1

|  | Raw | Hydrofined |
|---|---|---|
| Gravity, °API | 19.0 | 30.9 |
| Aniline No., °F | 131.4 | 163.3 |
| Sulfur, p.p.m | 1,100 | 47.3 |
| Nitrogen, p.p.m | 710 | 1.2 |
| Hydrogen, wt. percent | 10.69 | 12.68 |
| Distillation (10 mm.): | | |
| IBP, °F | 388 | 347 |
| 5 | 498 | 465 |
| 10 | 528 | 494 |
| 20 | 573 | 532 |
| 30 | 614 | 562 |
| 40 | 653 | 591 |
| 50 | 688 | 617 |
| 60 | 710 | 646 |
| 70 | 735 | 676 |
| 80 | 761 | 712 |
| 90 | 802 | 751 |
| EP | 832 | 786 |
| Recovery, percent | 95.0 | 95.0 |

The above hydrofined feed was hydrocracked under conditions shown in Table 2 to obtain the results shown in Table 2. The effluent from the hydrocracker was fractionally distilled to recover fractions boiling below about 380° F. The fraction boiling above about 380° F. was recycled to the hydrocracker inlet in order to effect extinction hydrocracking.

TABLE 2

| On stream time (days) | 2.8 | 4.0 | 6.3 | 8.3 | 11.2 | 13.3 |
|---|---|---|---|---|---|---|
| Conditions: | | | | | | |
| Pressure (total) p.s.i | 1,650 | 1,650 | 1,650 | 1,650 | 1,650 | 1,650 |
| Temperature, °F | 570 | 572 | 580 | 588 | 588 | 589 |
| LHSV (fresh feed-recycle feed) | 0.6-0.4 | 0.6-0.4 | 0.6-0.4 | 0.6-0.4 | 0.6-0.4 | 0.6-0.4 |
| $H_2$ circulation, s.c.f./b | 8,000 | 8,000 | 8,000 | 8,000 | 8,000 | 8,000 |
| Conversion, vol. percent | 99.9 | 99.5 | 98.0 | 91.8 | 100.0 | 94.4 |
| $H_2$ consumption, s.c.f./b | 997 | 833 | 896 | 823 | 1,072 | 1,169 |
| Product distribution: | | | | | | |
| $C_1$ wt. percent | .03 | .01 | .02 | .01 | .01 | |
| $C_2$ wt. percent | .07 | .11 | .07 | .08 | .15 | |
| $C_3$ wt. percent | 1.27 | 1.35 | 1.51 | 1.52 | 2.39 | 2.95 |
| $iC_4$ vol. percent | 9.2 | 10.0 | 10.6 | 10.8 | 15.1 | 22.3 |
| $nC_4$ vol. percent | 3.1 | 3.2 | 3.4 | 3.4 | 5.0 | 6.1 |
| $iC_5$ vol. percent | 11.1 | 11.6 | 11.6 | 11.8 | 16.4 | 19.7 |
| $nC_5$ vol. percent | 1.3 | 1.3 | 1.1 | 1.2 | 1.8 | 1.9 |
| 125-180 vol. percent | 13.2 | 9.6 | 14.0 | 12.3 | 11.7 | 7.2 |
| 180-380 vol. percent | 82.4 | 84.3 | 79.6 | 71.9 | 69.9 | 61.8 |
| 380 vol. percent | 0.1 | 0.5 | 2.0 | 8.2 | | 5.1 |
| Total | 120.4 | 120.5 | 122.3 | 119.9 | 119.9 | 124.6 |
| Selectivities, vol. percent: | | | | | | |
| $C_4$-380° F | 120.3 | 120.6 | 122.7 | 121.3 | 119.9 | 126.0 |
| $C_5$-380° F | 108.7 | 107.3 | 108.4 | 105.9 | 99.8 | 95.9 |
| 125-380° F | 95.6 | 94.5 | 95.5 | 91.7 | 81.6 | 73.1 |
| 180-380° F | 82.4 | 84.7 | 81.2 | 78.3 | 69.9 | 65.4 |

Samples from the recycle stream were periodically taken during the course of the reaction and measured for API gravity. The results are shown in FIG. 2 at curve 2.

As shown in Table 2, the yield of gasoline boiling range products materially decreased during a short period of time while the amount of gaseous components boiling below $C_5$ materially increased. This represents an undesirable loss of catalyst selectivity in a short on stream time. As for example, the selectivity of the catalyst in converting incoming feed to $C_5+$ to 380 naphtha decreased from 108 volume percent to 95.9 volume percent from 2.8 days on stream to 13.3 days on stream. During the corresponding period, the selectivity for products boiling at $C_4$ and below increased from 11.7 volume percent to 30.1 volume percent. Selectivities in the Table 2 and in the following examples are calculated by dividing the volume percent of the fraction made based upon the effluent by the conversion in volume percent. This calculation reflects the amount of the particular fraction obtained as a percentage of the total converted product. In addition, the API gravity of the recycle stream decreased so that it was below even that of the incoming pretreated hydrocracker feed. This shows an accumulation of refractory constituents in the recycle stream due to a poor ability of the catalyst to crack these materials. However, when these refractory materials were hydrocracked under increasingly severe conditions, a material loss of product selectivity resulted.

EXAMPLE 2

This example shows that when a recycle stream from the hydrocracking operation described in Example 1, is hydrocracked with an amorphous base catalyst rather than a zeolite base catalyst, improved product distribution and conversion result.

About 2 volume percent of the recycle stream produced in the process of Example 1 was continuously withdrawn and stored after the hydrocracking process had been on stream for about 80 days. Approximately equal portions of the withdrawn recycle stream were separately hydrocracked on a single pass basis; one portion with an amorphous base catalyst and the other portion over the zeolite base catalyst described in Example 1. The withdrawn recycle stream had the following properties:

TABLE 3

| | |
|---|---|
| Gravity, °API | 24.6 |
| Sulfur, p.p.m. | 40 |
| Nitrogen, p.p.m. | 5 |
| Distillation (by gas chromatography): | |
| IBP °F. | 400 |
| 5 | 506 |
| 10 | 560 |
| 30 | 671 |
| 50 | 727 |
| 70 | 872 |
| 90 | 923 |
| Recovery, percent | 95 |

The amorphous base catalyst employed was nickel sulfide on silica alumina.

Table 4 shows a comparison of the results obtained from the use of the two catalysts.

TABLE 4

| | Zeolite | Amorphous |
|---|---|---|
| Condition: | | |
| Total pressure, p.s.i. | 1,500 | 1,500 |
| Temperature, °F. | 558 | 552 |
| LHSV | 1.0 | 1.0 |
| H₂ circulation | 7,500 | 7,500 |
| Conversion to below 390° F., vol. percent | 44.0 | 46.8 |
| H₂ consumption, s.c.f./b | 1,300 | 820 |
| Product distribution: | | |
| C₁–C₃, wt. percent | 2.70 | 0.80 |
| iC₄, vol. percent | 14.85 | 1.75 |
| Other C₄s, vol. percent | 5.06 | 1.31 |
| iC₅, vol. percent | 12.51 | 4.74 |
| Other C₅s, vol. percent | 2.97 | 0.56 |
| 125–180 vol. percent | 9.69 | 8.35 |
| 180–390 vol. percent | 14.61 | 41.68 |
| 390–650 vol. percent | 7.86 | 33.04 |
| 650 vol. percent | 48.11 | 20.10 |
| Selectivity, vol. percent (180° F.–390° F.) | 33.2 | 88.9 |

As can be seen from Table 4, the amorphous base catalyst possesses a materially improved selectivity in cracking the heavy refractory compounds of a hydrocarbon mixture to gasoline boiling range products as compared to the zeolite base catalyst.

EXAMPLE 4

This example shows the improved selectivity in a hydrocracking process to produce gasoline of a catalyst system comprising a zeolite catalyst in a first stage hydrocracker and an amorphous catalyst in a second stage hydrocracker as opposed to the use of only a zeolite catalyst.

The zeolite catalyst used in the first stage hydrocracker of the two stage system and in the zeolite catalyst system is the zeolite catalyst described in Example 1. The zeolite catalyst had been on stream without regeneration 78.1 days but with 2 volume percent of the recycle being withdrawn during that time. The amorphous base catalyst used in the second stage hydrocracker system was fresh nickel sulfide on silica-alumina.

The petroleum hydrocarbon feeds employed are described in Table 6.

TABLE 6

| | A | B |
|---|---|---|
| Gravity, °API | 26.2 | 25.1 |
| Aniline No., °F | 144.2 | 149.8 |
| Sulfur, p.p.m. | 180 | 310 |
| Nitrogen, p.p.m. | 10 | 30 |
| Hydrogen, wt. percent | 11.98 | 11.68 |
| Distillation (10 min.): | | |
| IBP, °F | 398 | 378 |
| 5 | 484 | 477 |
| 10 | 517 | 505 |
| 20 | 555 | 540 |
| 30 | 590 | 579 |
| 40 | 626 | 612 |
| 50 | 655 | 646 |
| 60 | 678 | 673 |
| 70 | 705 | 698 |
| 80 | 733 | 723 |
| 90 | 781 | 761 |
| EP | 825 | 788 |
| Recovery, percent | 95 | 95 |

For the single stage hydrocracker with zeolite catalyst, the feed was hydrocracked and then fractionally distilled to recover products boiling below about 380° F. The fraction boiling above about 380° F. was recycled to the hydrocracker and cracked to extinction.

In the two stage zeolite-amorphous catalyst system, the feed was hydrocracked in the first stage with zeolite catalyst. The effluent from the first stage was flashed to remove ammonia and hydrogen sulfide from the effluent, and hydrocarbon products boiling below about 380° F. as separate streams. The remaining hydrocracked effluent boiling above about 380° F. was then directed to the second stage with amorphous catalyst and hydrocracked therein. The effluent from the second stage was fractionally distilled to recover products boiling below about 380° F. The remaining effluent boiling above about 380° F. was then recycled to the inlet of the second stage hydrocracker and cracked to extinction.

The operating conditions and products obtained for each catalyst system are described in Table 7.

TABLE 7

| | Single stage zeolite | | | Two stage zeolite-amorphous | |
|---|---|---|---|---|---|
| Charge stock | A | A | A | B | B |
| Time on stream (days) | 83.2 | 86.3 | 89.8 | 106.5 | 109.1 |
| Operating conditions: | | | | | |
| Total pressure, p.s.i. | 1,625 | 1,625 | 1,625 | 1,625 | 1,625 |
| Temperature, °F | 666 | 668 | 672 | 678 | 685 |
| LHSV, v./hr./v | 0.6–0.4 | 0.6–0.4 | 0.6–0.4 | 0.6–0.4 | 0.6–0.4 |
| H₂ circulation | 7,500 | 7,500 | 7,500 | 7,500 | 7,500 |
| Conversion, vol. percent | 97.4 | 97.7 | 97.3 | 97.3 | 100.0 |
| H₂ consumption, s.c.f./b | 2,000 | 1,850 | 1,870 | | 1,850 |
| Product distribution: | | | | | |
| C₁, wt. percent | .02 | .02 | .02 | .52 | .61 |
| C₂, wt. percent | .0 | .34 | .39 | .52 | .61 |
| C₃, wt. percent | 3.72 | 3.34 | 3.81 | 2.98 | 2.97 |
| iC₄, vol. percent | 14.5 | 13.1 | 13.8 | 12.3 | 5.7 |
| nC₄, vol. percent | 8.7 | 6.7 | 7.2 | 5.7 | 12.2 |
| iC₅, vol. percent | 16.0 | 14.4 | 15.3 | 13.7 | 12.2 |
| nC₅, vol. percent | 2.0 | 1.8 | 2.0 | 1.0 | 1.2 |
| 125–180, vol. percent | 10.9 | 12.7 | 17.9 | 13.5 | 14.9 |
| 180–380, vol. percent | 70.3 | 73.6 | 65.7 | 76.2 | 78.9 |
| 380, vol. percent | 2.6 | 2.3 | 2.7 | 2.7 | |
| Selectivities: | | | | | |
| C₄–380 | 125.4 | 125.1 | 125.2 | 125.7 | 123.5 |
| C₅–380 | 101.6 | 103.8 | 103.6 | 107.2 | 107.2 |
| 125–380 | 83.1 | 88.3 | 85.6 | 92.1 | 93.8 |
| 180–380 | 72.1 | 75.3 | 67.5 | 78.3 | 78.9 |

As can be seen from Table 7, the two stage zeolite-amorphous system even after being on stream longer than the one stage zeolite system exhibited superior selectivity toward gasoline boiling range products. In addition the API gravity of the recycle stream in the two stage system stabilized at 36.5° API as shown by curve 1 of FIG. 2 compared with 25.1° API for the incoming pretreated feed.

We claim:

1. A process for selectively producing gasoline from a heavy petroleum hydrocarbon charge containing nitrogen and condensed ring polycyclic compounds which comprises:

(a) subjecting the heavy hydrocarbon charge to hydrogenation pretreatment with a nitrogen tolerant catalyst under conditions selected to partially effect hydrogenation of nitrogen and condensed ring compounds sufficient to extend the useful life of the hydrogenation catalyst between regenerations, (b) passing the partially hydrogenated hydrocarbon feed material and containing no more than about 500 p.p.m. nitrogen in contact with a high actvity crystalline aluminosilicate hydrocracking catalyst under conditions to effect denitrogenation and partial cracking of said hydrogenated hydrocarbon feed to provide a product material including gasoline boiling range hydrocarbons and insufficiently converted high boiling hydrocarbon materials, (c) separating the effluent of step (b) under conditions to recover gaseous material, gasoline boiling hydrocarbons and higher boiling insufficiently converted material separately from one another, (d) passing separated higher boiling hydrocarbon material to separate contact with an amorphous base hydrocracking catalyst under limited conversion conditions selected to produce gasoline boiling range product material and (e) passing the effluent obtained in step (d) to the separation recited in step (c) above.

2. The process of claim 1 wherein the second stage of hydrocracking is carried out in the presence of no more than about 100 p.p.m. of nitrogen.

3. The process of claim 1 wherein the conversion in the first and second hydrocracking steps is limited to within the range of 40 to 80 volume percent.

4. The process of claim 1 wherein conversion in the separate hydrocracking steps is limited to within the range of 50 to 70 volume percent.

5. The process of claim 1 wherein the total effluent of the hydrogenation pretreatment step is passed to the crystalline aluminosilicate catalyst hydrocracking step.

6. A method for producing gasoline from a heavy hydrocarbon feed containing condensed ring polycyclic hydrocarbons, nitrogen and sulfur compounds which comprises:

(a) pretreating by hydrogenation said heavy hydrocarbon feed with a hydrogenation catalyst containing relatively low cracking activity under conditions to effect hydrogenation of condensed ring polycyclic hydrocarbons and a reduction of nitrogen and sulfur constituents in the feed, (b) effecting a further reduction of nitrogen and sulfur constituents in said heavy hydrocarbon feed by effecting a partial cracking thereof to gasoline product with a nitrogen tolerant catalyst comprising a high activity crystalline aluminosilicate hydrocracking catalyst under conditions selected to limit conversion of the feed to gasoline product in the range of 50 to 70 volume percent, (c) separating the effluent of step (b) under conditions to separately recover a high boiling insufficiently converted hydrocarbon fraction from a lower boiling gasoline fraction, (d) further converting the separated higher boiling hydrocarbon fraction with a nitrogen sensitive amorphous base hydrocracking catalyst under limited conversion conditions in the range of 50 to 70 volume percent and, (e) passing the effluent obtained in step (d) to the separation of step (c).

7. A method for producing gasoline from a heavy hydrocarbon feed containing polycyclic hydrocarbons, nitrogen and sulfur compounds which comprises:

(a) subjecting the heavy hydrocarbon feed containing polycyclic hydrocarbons, sulfur and nitrogen compounds to relatively mild hydrogenation conditions selected to effect at least partial hydrogenation of polycyclic hydrocarbons and a decomposition of sulfur and nitrogen compounds so that less than about 500 p.p.m. of combined nitrogen remains in the charge, (b) subjecting a hydrogenated liquid product obtained from step (a) to a first stage of hydrocracking in the presence of a crystalline aluminosilicate hydrocracking catalyst maintained under hydrocracking conditions selected to limit the conversion of the hydrogenated charge within the range of 40 to 80 volume percent to gasoline boiling constituents while effecting a further substantial reduction by hydrogenation of the combined sulfur and nitrogen constituents in the hydrocarbon charge, (c) separating the products of the first hydrocracking stage to separately recover gaseous material, gasoline boiling range constituents and a hydrocarbon fraction boiling above gasoline constituents, (d) hydrocracking in a second stage the high boiling hydrocarbon fraction separated in step (c) by contact with an amorphous hydrocracking catalyst sensitive to nitrogen constituents, under conditions selected to limit conversion of said high boiling fraction in the range of 40 to 80 volume percent and (e) passing the effluent obtained in the second hydrocracking step to the common separation step (c) above recited for recovery of gasoline and lower boiling constituents from higher boiling insufficiently converted hydrocarbon material.

8. In a process for upgrading a heavy hydrocarbon feed material containing condensed ring polycyclic compounds, sulfur and nitrogen compounds by hydrocracking, the method for improving the yield of gasoline boiling product material which comprises passing the heavy hydrocarbon feed material initially sequentially in contact with a hydrogenation pretreat catalyst of very low cracking activity and then in contact with a crystalline aluminosilicate hydrocracking catalyst of relatively high activity under conditions selected so as to obtain only partial conversion of said hydrocarbon feed material in said sequence of catalyst contacts but substantially complete desulfurization and denitrogenation of the hydrocarbon feed material, separating the product effluent obtained by the above pretreat-hydrocracking sequence to recover gasoline boiling materials separately from higher boiling insufficiently converted hydrocarbon material, further hydrocracking the recovered higher boiling insufficiently converted material with a nitrogen sensitive amorphous base hydrocracking catalyst under conversion conditions limited to within the range of 50 to 70 volume percent and separating the product effluent obtained with the nitrogen sensitive amorphous base hydrocracking catalyst in a common separation zone with the product effluent obtained by the pretreat-hydrocracking sequence.

9. A method for producing gasoline by hydrocracking which comprises contacting a heavy petroleum hydrocarbon feed selected to contain no more than from about 30 to about 500 p.p.m. of combined nitrogen in combination with polycyclic hydrocarbons in a first hydrocracking zone containing a nitrogen tolerant crystalline aluminosilicate hydrocracking catalyst having a pore size opening in the range of from about 6 angstroms to about 15 angstroms and containing less than about 5 weight percent sodium oxide, said crystalline aluminosilicate hydrocracking contact step being effected under limited conversion conditions which are sufficient to reduce combined nitrogen therein below about 100 p.p.m. and effect the hydrogenation of polycyclic hydrocarbons, recovering and separating an effluent from said first stage crystalline aluminosilicate hydrocracking zone under conditions to recover gasoline material separately from a higher boiling hydrocarbon fraction, separately contacting the separated higher boiling hydrocarbon fraction in a second hydrocracking zone containing an amorphous base hydrocracking catalyst having a Cat A activity index above about 20 under conditions selected to limit conversion therein in the range of 40 to 80 volume percent, recovering and separating an effluent from said second stage hydrocracking zone in a common separation zone with the effluent of said first hydrocracking zone and passing separated liquid material boiling above separated gasoline material and containing less than 100 p.p.m. of combined nitrogen to the above recited second stage hydrocracking zone.

10. The process of claim 9 wherein the conversion to products boiling below 400° F. in each hydrocracking stage is maintained between about 50 and about 70 volume percent based upon the fresh feed to the respective hydrocracking stages.

11. The process of claim 9 wherein the crystalline aluminosilicate catalyst is a X type of rare earth exchanged crystalline aluminosilicate and contains nickel-tungsten sulfide.

12. The process of claim 9 wherein the crystalline aluminosilicate catalyst is a X type of rare earth exchanged crystalline aluminosilicate promoted with platinum.

13. The process of claim 9 wherein the crystalline aluminosilicate catalyst is a Y type of rare earth exchanged crystalline aluminosilicate promoted with nickel-tungsten sulfide.

14. The process of claim 9 wherein the crystalline aluminosilicate catalyst is a Y type of rare earth exchanged crystalline aluminosilicate promoted with platinum.

References Cited

UNITED STATES PATENTS

| | | | |
|---|---|---|---|
| 3,272,734 | 9/1966 | MacLaren | 208—89 |
| 3,140,253 | 7/1964 | Plank et al. | 208—120 |
| 3,287,252 | 11/1966 | Young | 208—59 |

DELBERT E. GANTZ, Primary Examiner

U.S. Cl. X.R.

208—59